L. GROSS.
DEVICE FOR HOLDING WORK UPON MACHINE TOOLS.
APPLICATION FILED JULY 13, 1916.
1,262,781. Patented Apr. 16, 1918.
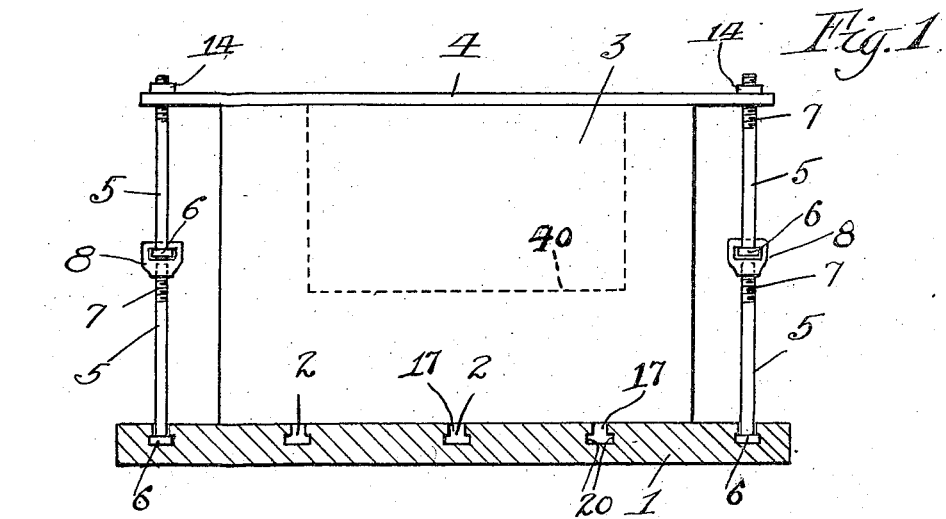
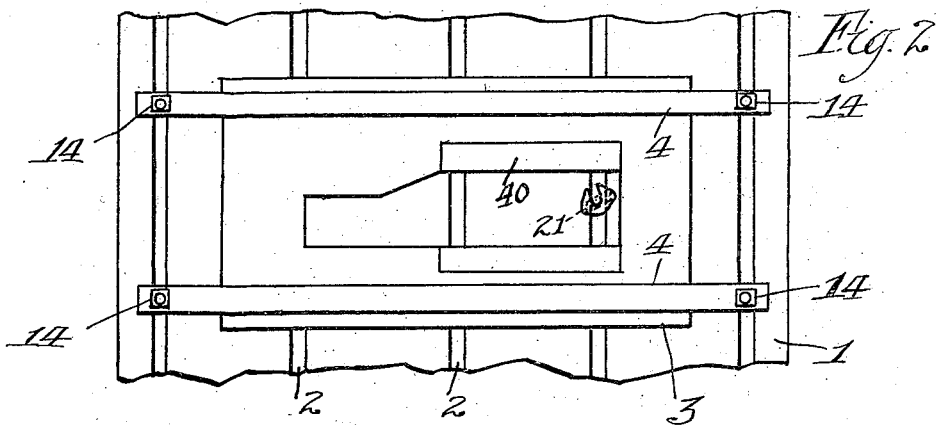
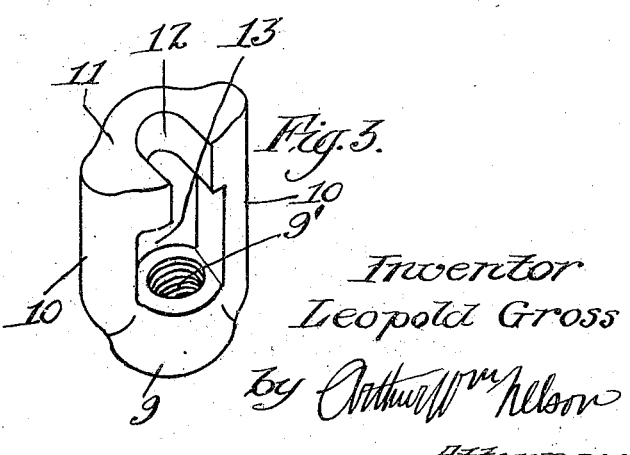
Inventor
Leopold Gross
by Arthur Wm Nelson
Attorney

UNITED STATES PATENT OFFICE.

LEOPOLD GROSS, OF AURORA, ILLINOIS.

DEVICE FOR HOLDING WORK UPON MACHINE-TOOLS.

1,262,781.  Specification of Letters Patent.  Patented Apr. 16, 1918.

Application filed July 13, 1916. Serial No. 109,168.

*To all whom it may concern:*

Be it known that I, LEOPOLD GROSS, a citizen of the United States, and a resident of Aurora, county of Kane, State of Illinois, have invented certain new and useful Improvements in Devices for Holding Work Upon Machine-Tools, of which the following is a specification.

My invention relates generally to improvements in means for holding work upon machine tools and has particular reference to means for holding work upon machine tools provided with T slots.

The general object of my invention is to provide means whereby work of different thicknesses can be secured in working condition without the necessity of having a large number of securing bolts of different lengths.

A further object of my invention is to provide means whereby, with a limited number of given length bolts, work of greatly differing sizes or thicknesses can be secured.

Other objects of my invention are to simplify the securing of work upon machine tools; to reduce the time necessary for such operations; and to provide means which can be attached to hollow work after it has been secured to the machine.

My invention consists generally in the form, arrangement, and construction of parts whereby the above named objects, together with others which will appear hereinafter, are attainable.

My invention will be more readily understood by reference to the accompanying drawings, illustrating the preferred embodiment thereof, and wherein—

Figure 1 is a view in elevation, illustrating work secured to a machine tool by devices embodying my invention.

Fig. 2 is a plan view of a fragmentary part of a machine tool bed showing the work secured thereto by devices embodying my invention.

Fig. 3 is a perspective view of one of the coupling members embodying my invention.

In using various machine tools, such, for example, as shapers, planers, lathes, drill presses, etc., it is customary to secure the work to be operated upon to the bed, face plate, or other work carrying member by means of bolts, the heads of which enter T slots in the bed or face plate, and the ends of the bolts passing through straps which engage the work. Under modern machine practice a given machine will operate upon work of greatly varying sizes and thicknesses and it has hitherto been necessary to provide a great number of bolts of different lengths to secure such work. As a number of bolts are necessary to hold each piece of work firmly in place, it will be seen that with the many lengths necessary a large stock of bolts must be provided. This is particularly burdensome in a general machine shop where several pieces of work of the same length may be operated upon simultaneously. Not only does this necessitate a large outlay of money but the machinist is delayed in finding the proper size for a given job. I have provided means whereby a relatively few bolts can be made to serve as holding devices upon work of any thickness, thereby greatly reducing the number of holding bolts necessary and also facilitating the operation of fastening a given piece of work upon the machine.

Having thus described the general objects and purposes of my invention, I shall describe the construction in detail, reference being had to the accompanying drawings, wherein 1 represents a work holding bed or plate of a machine tool provided with a plurality of T slots 2. 3 represents a piece of work which is secured to the plate or bed by means of straps 4 of usual construction. These straps 4 have hitherto been bound to the work by means of bolts, the heads of which entered the T slots in the bed and which bolts were long enough to reach to and through the straps. Instead of providing a large number of bolts of different lengths, I provide a number of short length bolts 5, which for sake of convenience I shall refer to herein as unit bolts. These unit bolts each have a head 6 of a size adapted to enter the T slots 2 in the bed and a threaded end 7. The work 3 in this instance is of such thickness that it cannot be spanned by a single unit bolt and in this event I connect another unit bolt to the one entering the bed by means of a simple device 8 which I shall herein refer to as a unit bolt connector. This novel unit bolt connector comprises an end portion 9, which is internally threaded, as indicated at 9′, for complementary engagement with the threaded end of the unit bolt. Upstanding from the portion 9 are spaced arms 10 supporting a transverse portion 11, in which I form a slot 12 of a width sufficient to admit the shank portion of a unit bolt. I so space the upstanding arms 10 as to form a space or recess 13 of a size sufficient to admit the head of the bolt. Thus to connect two unit bolts it is but necessary to screw the unit bolt connector upon the end of a unit bolt and to place the head of the second bolt into the space 13 of the unit bolt connector. The shank portion of the bolt is of course accommodated in the slot 12. The end of the second unit bolt serves to take an ordinary nut 14.

Inasmuch as this disclosure will readily suggest modified structures embodying my invention, I do not wish to be limited to the specific constructions herein shown and described, except as may be necessary by limitations in the hereunto appended claims.

I claim:

1. Means for holding work upon machine tools, comprising in combination with a machine bed provided with undercut slots therein, headed bolt members with their heads disposed in said undercut slots, a connecting bar having headed bolts secured therein and bolt connectors for connecting the bolts in the slots and the bolts in the connecting bar, said bolt connectors being provided with threaded openings to receive threaded ends of the bolts in the bed and slots and recesses to receive the headed ends of the bolts of the connecting bar.

2. Means for holding work upon machine tools, comprising in combination with a machine bed provided with undercut slots, a pair of headed bolt members with their heads movably disposed within said undercut slots, a connecting bar for engaging the work to be held on the machine bed and provided at each end with a headed bolt secured therein, the headed bolts of the connecting bar and the headed bolts of the machine bed adapted to aline, and bolt connectors for connecting the bolts of the connecting bar with the bolts of the machine bed, said bolt connectors being provided with threaded openings to receive the threaded ends of the bolts in the bed and also provided with slots and recesses to receive the headed ends of the bolts of the connecting bar.

In testimony whereof, I have hereunto set my hand, this 26th day of June, 1916.

LEOPOLD GROSS.

Copies of this patent may be obtained for five cents each, by addressing the "Commissioner of Patents, Washington, D. C."